United States Patent
Lian et al.

(10) Patent No.: US 8,724,780 B2
(45) Date of Patent: May 13, 2014

(54) VOICE INTERACTION METHOD OF MOBILE TERMINAL BASED ON VOICEXML AND MOBILE TERMINAL

(75) Inventors: Dongzhou Lian, Shenzhen (CN); Xuesen Yang, Shenzhen (CN); Haiyong Peng, Shenzhen (CN); Guang Chen, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 336 days.

(21) Appl. No.: 13/259,130

(22) PCT Filed: Sep. 24, 2009

(86) PCT No.: PCT/CN2009/074192
§ 371 (c)(1),
(2), (4) Date: Sep. 22, 2011

(87) PCT Pub. No.: WO2010/111861
PCT Pub. Date: Oct. 7, 2010

(65) Prior Publication Data
US 2012/0010889 A1 Jan. 12, 2012

(30) Foreign Application Priority Data
Mar. 30, 2009 (CN) .......................... 2009 1 0130320

(51) Int. Cl.
*H04M 11/00* (2006.01)

(52) U.S. Cl.
USPC ....................................... 379/88.14; 704/270

(58) Field of Classification Search
USPC ................................ 379/88.14, 235; 709/201
See application file for complete search history.

(56) References Cited

U.S. PATENT DOCUMENTS

| 7,170,979 | B1 | 1/2007 | Byrne et al. |
| 2001/0032234 | A1* | 10/2001 | Summers et al. ............. 709/201 |

(Continued)

FOREIGN PATENT DOCUMENTS

| CN | 1427394 A | 7/2003 |
| CN | 1457180 A | 11/2003 |

(Continued)

OTHER PUBLICATIONS

PCT, International Search Report in Application No. PCT/CN2009/074192, dated Jan. 14, 2010.

(Continued)

*Primary Examiner* — Simon Sing
*Assistant Examiner* — Van D Huynh
(74) *Attorney, Agent, or Firm* — McAndrews Held & Malloy, Ltd.

(57) ABSTRACT

The present invention discloses a voice interaction method of a mobile terminal based on VoiceXML and a mobile terminal, which comprises: converting received voice information into a VoiceXML document, parsing the VoiceXML document according to a preset VoiceXML document framework, searching the information of the function which needs to be realized by the voice information corresponding to the VoiceXML document; mapping found function information to the function corresponding to the particular function of the man-machine interface, and informing the mapped function to the man-machine interface; performing VoiceXML response document conversion on the response information from the man-machine interface, and playing the conversion result via a corresponding voice information. According to the technical solution of the present invention, the advanced intelligence and complex voice interaction can be realized, and the transportability of voice interaction is improved.

7 Claims, 4 Drawing Sheets

(56) References Cited

U.S. PATENT DOCUMENTS

| | | |
|---|---|---|
| 2002/0191756 A1 | 12/2002 | Guedalia et al. |
| 2004/0037401 A1 | 2/2004 | Dow et al. |
| 2004/0203629 A1 | 10/2004 | Dezonno et al. |
| 2005/0028085 A1 | 2/2005 | Irwin et al. |
| 2005/0137875 A1* | 6/2005 | Kim et al. .................. 704/270.1 |
| 2007/0047719 A1* | 3/2007 | Dhawan et al. ............... 379/235 |

FOREIGN PATENT DOCUMENTS

| | | |
|---|---|---|
| CN | 1558655 A | 12/2004 |
| CN | 1558656 A | 12/2004 |
| CN | 1592277 A | 3/2005 |
| CN | 1708078 A | 12/2005 |
| CN | 101106509 A | 1/2008 |
| CN | 101527755 A | 9/2009 |
| EP | 1814293 A1 | 8/2007 |
| EP | 1860862 A1 | 11/2007 |

OTHER PUBLICATIONS

European Patent Office, Communication with extended European search report, in Application No. 09842517.6, dated Jun. 28, 2013.

* cited by examiner

VOICE INTERACTION METHOD OF MOBILE TERMINAL BASED ON VOICEXML AND MOBILE TERMINAL

FIELD OF THE INVENTION

The present invention relates to communication field, in particular to a voice interaction method of a mobile terminal based on Voice Extensible Markup Language (VoiceXML) and a mobile terminal.

BACKGROUND OF THE INVENTION

With the increasing intelligentization of the mobile terminal, such as a mobile phone, man-machine interaction becomes a trend. Users wish their mobile phones would be like a secretary, and the complex practical operation can be replaced by simple man-machine interaction.

The particular document structure voice based on XML (VoiceXML) is markup language applied to voice browse, and is able to separate the code for user interaction from service logic. By using VoiceXML document, it is capable to develop the interaction system closer to human language and increase the intelligence in voice interaction, and the interaction system developed is capable of being applicable to various application platforms.

At present, simple man-machine interaction manners have been existed, i.e., the mobile phone is informed of the number to be dialed via dialogue. However, the voice interaction of the above manner has the disadvantages: of the voice interaction is inflexible, the dialogue has to be carried out according to the predetermined procedure such that the intelligence is poor, and it lacks of the flexibility for transplanting across different platforms.

However, aiming at the problem that the voice interaction technology has poor intelligence and is incapable of transplanting across different platforms, so far in the related art there is no effective solution provided.

SUMMARY OF THE INVENTION

The present invention is provided aiming at the problem that the voice interaction technology has poor intelligence and is incapable of transplanting across different platforms in the related art, the main purpose of the present invention is to provide a voice interaction method of a mobile terminal based on VoiceXML and a mobile terminal, so as to solve at least one of the problems existing in prior art.

In order to achieve the above purpose, a voice interaction method of a mobile terminal based on VoiceXML is provided according to an aspect of the present invention.

The voice interaction method for the mobile terminal based on VoiceXML according to present invention comprises: converting the received voice information into a VoiceXML document, parsing the VoiceXML document according to a preset VoiceXML document framework, searching the information of the function which needs to be realized by the voice information corresponding to the VoiceXML document, wherein the VoiceXML document framework comprises at least one piece of function information and the corresponding VoiceXML document; mapping found function information to the function corresponding to the particular function of the man-machine interface, and informing the mapped function to the man-machine interface; and performing VoiceXML response document conversion on the response information from the man-machine interface, and playing the conversion result via a corresponding voice information.

Preferably, the step of converting the received voice information into a VoiceXML document comprises: extracting identified text in the voice information through the voice recognition based on VoiceXML, and combing the extracted text into the VoiceXML document.

Preferably, the step of parsing the VoiceXML document based on the preset VoiceXML document framework comprises: determining the key node in the VoiceXML document, searching the corresponding key node in the VoiceXML document framework, and making the valid data corresponding to the found key node serving as the function information which needs to be realized by the message information.

Preferably, the step of mapping the found function information to the function corresponding to the particular function of the man-machine interface comprises: mapping the found function information to the function to the information of a corresponding functional function and the function parameter which can be executed by the man-machine interface, and making the mapped information of functional function and the function parameter serving as the function mapped.

Preferably, the step of performing VoiceXML response document conversion on the response information from the man-machine interface and playing the conversion result via a corresponding voice information comprise: converting the response information from the man-machine interface to the VoiceXML response document; and extracting the voice information in the VoiceXML response document, and synthesizing the voice information through voice synthesis based on VoiceXML voice, to play.

According to another aspect of the present invention, a mobile terminal is provided.

A mobile terminal, which comprises a man-machine interface module, and the mobile terminal also comprises: an interaction function interface module, configured to convert the received voice information into a VoiceXML document, and to play the conversion result of the VoiceXML response document via the corresponding voice information; and a function mapping module, configured to parse the VoiceXML document according to a preset VoiceXML document framework, to search the information of the function which needs be realized by the voice information corresponding to the VoiceXML document, to map the found function information to the function corresponding to the particular function of the man-machine interface function module, to inform the man-machine interface function module of the mapped function, and further configured to convert the response information from the man-machine interface function module to VoiceXML response document, and to send the conversion result to the interaction function interface module.

Preferably, interaction function interface module comprises: an interaction interface, configured to receive the voice information from a user, to send the voice information to a voice recognition module, and to play the voice information from the voice synthesis module;

the voice recognition module, configured to extract identified text in the voice information from the interaction interface through the voice recognition based on VoiceXML, and to combine the extracted text into the VoiceXML document; and the voice synthesis module, configured to extract voice information in the VoiceXML response document from the function mapping module and to synthesize the voice information through voice synthesis based on VoiceXML.

Preferably, the function mapping module comprises: a configuration module, adapted to configure the VoiceXML document framework, wherein the VoiceXML document framework comprises at least one piece of function information and the corresponding VoiceXML document; and a VoiceXML parser, configured to determine the key node of the VoiceXML document from the voice recognition module, to search the corresponding key node in the VoiceXML document framework and to make the valid data corresponding to the found key node serving as the function information which needs be realized by the voice information, and further configured to convert response information from the function interaction module to VoiceXML response document; and the function interaction module, configured to map the found function information to the function corresponding to the man-machine interface function module, and to inform the man-machine interface function module of the mapped function, and to receive the response information from the man-machine interface function module.

Preferably, the function, corresponding to the man-machine interface function module and mapped by the function interaction module, is the information of the corresponding functional function and the function parameter which can be executed by the man-machine interface module.

With the above mentioned technical solution of the present invention, by adding an interaction function interface module and a function mapping module into the software MMI layer of the mobile terminal, the problem in the related art that the voice interaction technology has poor intelligence and is incapable of transplanting across different platforms is solved, and the advanced intelligence and complex voice interaction can be realized. Moreover, the technical solution according to the embodiments of the present invention can be applied to various platforms, which increases the transportability of voice interaction.

BRIEF DESCRIPTION OF THE DRAWINGS

The drawings herein are used to provide further understanding of the present invention and form a part of the application. The exemplary embodiments and the description thereof are used to explain the present invention without unduly limiting the scope of the present invention, wherein.

DETAILED DESCRIPTION OF EMBODIMENTS

Function Overview

The main idea of the present invention is of converting the received voice information into a VoiceXML document, parsing the VoiceXML document according to the preset VoiceXML document framework, searching the information of the function which needs to be realized by the voice information corresponding to the VoiceXML document; mapping the found function information to the function corresponding to the particular function of the man-machine interface, and informing the mapped function to the man-machine interface; performing VoiceXML response document conversion on the response information from the man-machine interface, and playing the conversion result via a corresponding voice information. By the present invention, the advanced intelligence and complex voice interaction can be realized, and moreover, the technical solution according to the embodiments of the present invention can be applied to various platforms, which increases the transplanting ability of the voice interaction.

The preferred embodiments of the present invention will be described in connection with drawings. It is to be understood that the preferred embodiments described herein is intended to illustrate and explain the present invention rather than limit the present invention. Without contradiction, the embodiments of the present invention and the features thereof can be combined with each other.

Device Embodiments

According to the embodiment of the present invention, a mobile terminal is provided.

Figure 1:
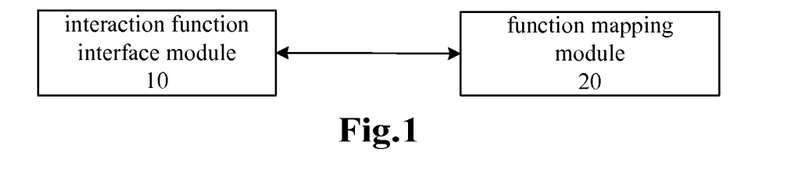
FIG. 1 is a structural block diagram of a mobile terminal according to an embodiment of the present invention.

FIG. 1 is a structural block diagram of a mobile terminal according to an embodiment of the present invention. As shown in FIG. 1, the mobile terminal comprises: an interaction function interface module 10 and a function mapping module 20.

The functions of each module in the mobile terminal will be described in detail in the following.

The Interaction function interface module 10 is configured to convert the received voice information into a VoiceXML document, and to play the conversion result of the VoiceXML response document via the corresponding voice information.

The function mapping module 20, which is connected to interaction function interface module 10, is configured to parse the VoiceXML document according to the preset VoiceXML document framework, to search the information of the function which needs to be realized by the voice information corresponding to the VoiceXML document, to map the found function information to the function corresponding to the particular function of the man-machine interface function module, to inform the man-machine interface function module of the mapped function, and is further configured to convert the response information from the man-machine interface function module into VoiceXML response document, and to send the conversion result to the interaction function interface module.

Figure 2:
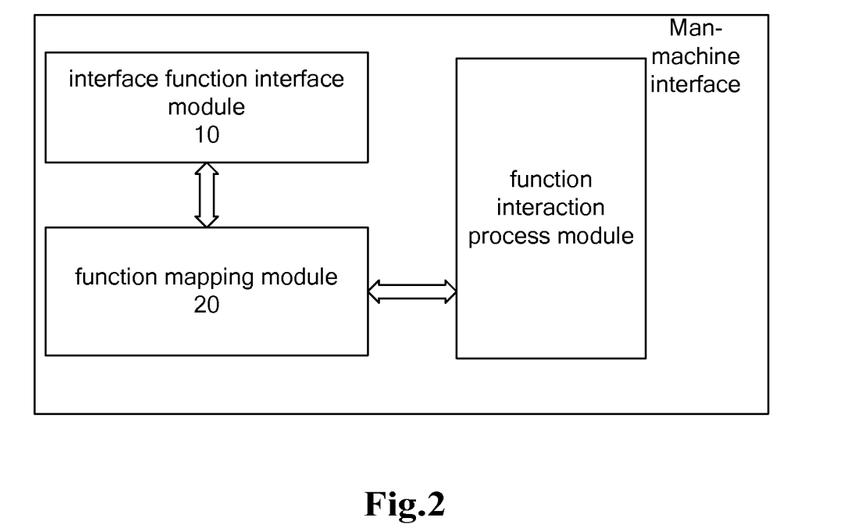
FIG. 2 is a block diagram of one preferred structure according to an embodiment of the present invention.

FIG. 2 shows the corresponding positions of the interaction function interface module 10 and the function mapping module 20 in a mobile terminal according to an embodiment of the present invention. As shown in FIG. 2, the man-machine interface (MMI) layer of the mobile terminal comprises a MMI function module which is added with the interaction function interface module 10 and the function mapping module 20 according an embodiment of the present invention.

Figure 3:
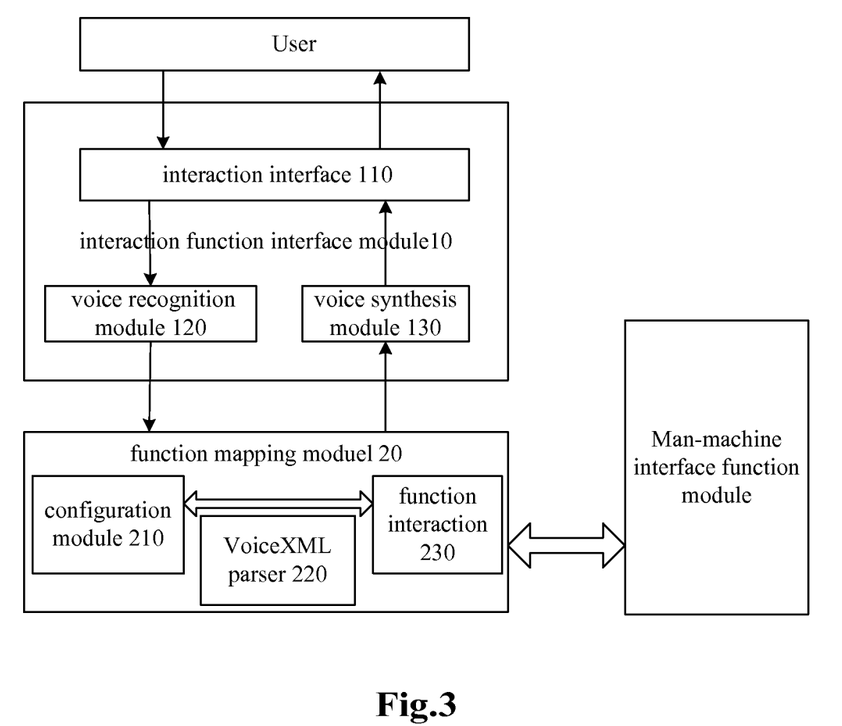
FIG. 3 is a block diagram of another preferred structure according to an embodiment of the present invention.

FIG. 3 is a block diagram of another preferred structure according to an embodiment of the present invention. As shown in FIG. 3, based on the structure shown in FIG. 1, the interaction function interface module 10 according to the embodiment of the present invention further comprises: an interaction interface 110, a voice recognition module 120, and a voice synthesis module 130, wherein:

the interaction interface 110 is configured to receive the voice information from the user, to send the voice information to the voice recognition module, and to play the voice information from the voice synthesis module;

the voice recognition module 120, which is connected to the interaction interface 110, is configured to extract the identified text in the voice information from the interaction interface by means of the voice recognition based on VoiceXML, and to combine the extracted text into a VoiceXML document; and the voice synthesis module 130, which is connected to interaction interface 110, is configured to extract the voice information in the VoiceXML response document from the function mapping module and to synthesize the voice information through the voice synthesis based on VoiceXML.

Furthermore, the function mapping module 20 further comprises: a configuration module 210, a VoiceXML parser 220, and a function interaction module 230, wherein the configuration module 210 is used to configure the VoiceXML document framework, wherein the VoiceXML document framework comprises at least one piece of function information and the corresponding VoiceXML document;

the VoiceXML parser 220, which is connected to the configuration module 210, is configured to determine the key node of the VoiceXML document from the voice recognition module, to search the corresponding key node in the VoiceXML document framework and to make the valid data corresponding to the found key node serving as the function information to be realized by the voice information, and is further configured to convert the response information from the function interaction module to VoiceXML response document;

the function interaction module 230, which is connected to the VoiceXML parser 220, is configured to map the found function information to the function corresponding to the man-machine interface function module, and inform the man-machine interface function module of the mapped function, and receive the response information from the man-machine interface function module. Preferably, the function corresponding to man-machine interface function module, which is mapped by the function interaction module, is the information of corresponding functional function and the function parameter able to be performed by the man-machine function module.

According to the above embodiment of the present invention, by adding an interaction function interface module and a function mapping module to the MMI layer of the mobile terminal, the advanced intelligence and complex voice interaction can be realized; the operations, such as the operations of normal calling, messaging, and operating name card fold, can be achieved; and moreover, the modules provided by the present invention can be transplanted across various platforms, wherein the voice interaction developers are only required to compile various VoiceXML document frameworks to achieve the interaction among different communication logics, thus the transplanting ability of voice interaction is improved.

According to the above embodiments of the present invention, by adding an interaction function interface module and a function mapping module to the mobile terminal, the man-machine interaction based on VoiceXML is realized, and the intelligence and transplanting ability of the voice interaction is improved.

Method Embodiments

Figure 4:
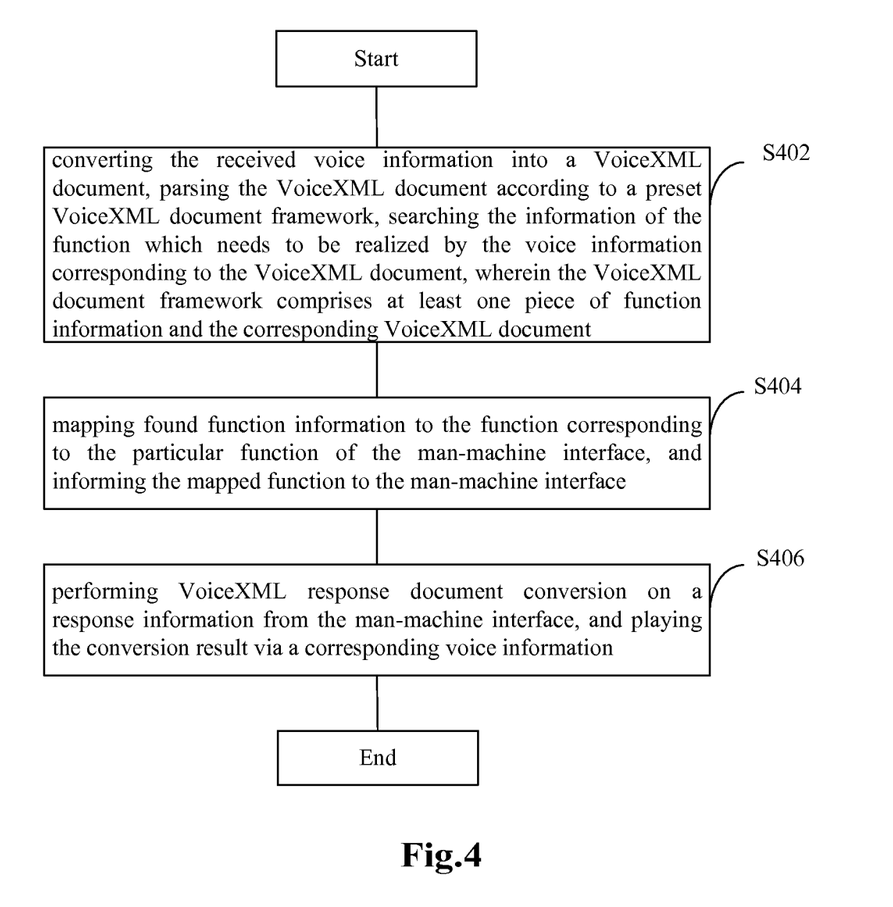
FIG. 4 is a flowchart of a voice interaction method of the mobile terminal based on VoiceXML according to an embodiment of the present invention.

FIG. 4 is a flowchart of the voice interaction method of the mobile terminal based on VoiceXML according to an embodiment of the present invention. With this method, the mobile terminal provided by the above device embodiment can be realized.

It is to be noted that, the processes described hereinafter can be executed by the computer system of a set of computer executable instructions, and although FIG. 4 shows the logic sequence, in some circumstance, the processes can be executed in a sequence other than those shown herein. As shown in FIG. 4, the method comprises the following steps (step S402 to step S406):

Step S402, converting the received voice information into a VoiceXML document, parsing the VoiceXML document according to the preset VoiceXML document framework, searching the information of the function which needs to be realized by the voice information corresponding to the VoiceXML document, wherein the VoiceXML document framework comprises at least one piece of function information and the corresponding VoiceXML document; and extracting the identified text in the voice information through the voice recognition based on VoiceXML, and combing the extracted text into a VoiceXML document, determining the key node of the VoiceXML document, searching the corresponding key node in the VoiceXML document framework, and making the valid data corresponding to the found key node serving as the function information to be realized by the voice information.

Step S404, mapping the found function information to the function corresponding to the particular function of the man-machine interface, and informing the mapped function to the man-machine interface; and mapping the found function information to the information of the corresponding functional function and the function parameter executable by the man-machine interface, and making the mapped information of functional function and function parameter serving as the mapped function to be processed, and returns the information of the function process result.

Step S406, performing VoiceXML response document conversion on the response information from the man-machine interface, and playing the conversion result through the corresponding voice information.

After informing the mapped function to the man-machine interface, man-machine interface performs the corresponding operation according to the function and can display the operation result through the interaction interface, and thereafter, the man-machine interface returns the response information of the operation, and the response information is converted into a VoiceXML response document, the voice information in the VoiceXML response document is extracted, and the voice information is synthesized via the voice synthesis based on VoiceXML to be played.

Figure 5:
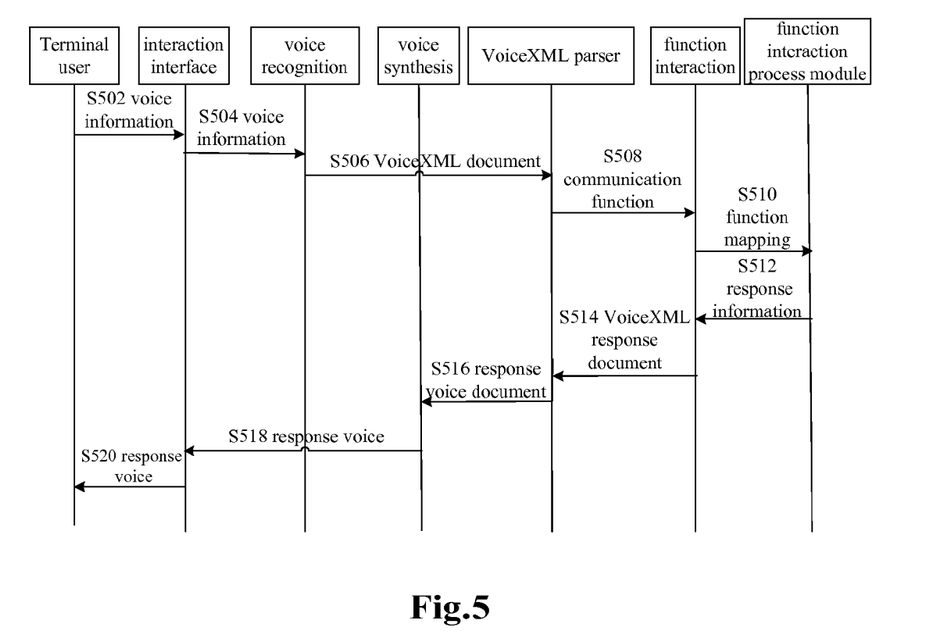
FIG. 5 is a flowchart of the preferred process solution of the voice interaction method of the mobile terminal based on VoiceXML according to an embodiment of the present invention.

The technical solution of the embodiment of the present invention will be described in detail in connection with dialing according to names. FIG. 5 is the flow chart of the preferred process solution of the voice interaction method of the mobile terminal based on VoiceXML according to the embodiment of the present invention. As shown in FIG. 5, the process comprises following steps:

Previous conditions: the mobile terminal has been turned on normally and is being under standby state, and at this point, the voice interaction module has been started, waiting for the communication function "spoken" by the user.

Step S502, the user tells the mobile terminal to dial a certain name.

Step S504, the interaction interface module obtains the voice prompt, and transmits the voice information to the voice recognition module.

Step S506, the voice recognition module extracts the identified text via the voice recognition based on VoiceXML, and combines into the corresponding VoiceXML document.

Step S508, the VoiceXML parser parses the VoiceXML document, extracts the information of the function to be realized by the VoiceXML document according to the preset VoiceXML document framework, associates each node in the VoiceXML document framework with the function and associates the information in the node with the content of the operation, and transmits them as an integrated structure to the function interaction module.

Step S510, the function interaction module maps the structure transmitted by the parser to the information of the corresponding functional function and function parameter, and completes the operation of mapping the particular function as the corresponding MMI function, and transmit it to function interaction process module.

Step S512, the function process module transmits a response to the function interaction module after completing the function realization.

Step S514, the function interaction module packages the corresponding response structure and transmits it to the parser.

Step S516, with the parser as the bridge, the response structure is converted into a response document with uniform VoiceXML format, and transmits it to the voice synthesis module.

Step S518, the voice synthesis module extracts voice information according to the structure characteristics of a VoiceXML document, and synthesizes the voice information into voice (according to the document structure characteristics, performing the corresponding processes on sound, tone, speed, pause and so on, which makes the interaction more fluent).

Step S520, the interaction interface plays the synthesized voice to the user, and simultaneously, the terminal interface displays the corresponding state according to the function.

Preferably, FIG. 5 shows a flow of a whole voice interaction operation in normal condition according to an embodiment of the present invention.

Based on above description, with the above mentioned technical solution of the present invention, by adding an interaction function interface module and a function mapping module to the software MMI layer of the mobile terminal, the advanced intelligence and complex voice interaction can be realized, and moreover, the technical solution according to the embodiments of the present invention can be applied to various platforms, which increases the transportability of voice interaction.

Apparently, the person skilled in the art should know that each module or each step in the present invention can be realized by the general calculating apparatus; and they can be collected in a single calculating apparatus or distributed on a network formed by a plurality of calculating apparatus. Optionally, they can be realized by the program codes executable by the calculating apparatus, therefore, they can be stored in the storing apparatus to be executed by the calculating apparatus, or they can be fabricated into integrated circuit modules, respectively, or a plurality of steps therein are fabricated into individual integrated circuit module for the accomplishment. Thus, the present invention is not limited to the combination of any particular hardware and software.

The above mentioned is merely used for describing the preferred embodiments of the present invention but not limiting the present invention. Various alterations and changes made to the present invention are apparent to the person skilled in the art. Any modifications, equivalent substitutions, improvements etc. within the spirit and principle of the present invention should be covered by the protection scope of the present invention.

What is claimed is:

1. A voice interaction method of a mobile terminal based on VoiceXML, comprising:
    the mobile terminal converting a received voice information into a VoiceXML document, parsing the VoiceXML document according to a preset VoiceXML document framework, searching information of the function which needs to be realized by the voice information corresponding to the VoiceXML document, wherein the VoiceXML document framework comprises at least one piece of function information and the corresponding VoiceXML document;
    mapping found function information to the function corresponding to the particular function of the man-machine interface, and informing the mapped function to the man-machine interface; and
    performing VoiceXML response document conversion on a response information from the man-machine interface, and playing the conversion result via a corresponding voice information;
    wherein the step of parsing the VoiceXML document based on the preset VoiceXML document framework comprises: determining a key node of the VoiceXML document, searching the corresponding key node in the VoiceXML document framework, and making the valid data corresponding to the found key node serving as the function information which needs be realized by the message information.

2. The method according to claim 1, wherein the step of converting the received voice information into a VoiceXML document comprises:
    extracting identified text in the voice information through the voice recognition based on VoiceXML, and combining the extracted text into the VoiceXML document.

3. The method according to claim 1, wherein the step of mapping the found function information to the function corresponding to the particular function of the man-machine interface comprises:
    mapping the found function information to the information of a corresponding functional function and the function parameter which can be executed by the man-machine interface, and making the mapped information of functional function and the function parameter serving as the function mapped.

4. The method according to claim 3, wherein the step of performing VoiceXML response document conversion on the response information from the man-machine interface and playing the conversion result via a corresponding voice information comprises:
    converting the response information from the man-machine interface to the VoiceXML response document; and
    extracting the voice information in the VoiceXML response document, and synthesizing the voice information through voice synthesis based on VoiceXML, to play.

5. A mobile terminal, which comprises a man-machine interface module, wherein the mobile terminal further comprises:
    an interaction function interface module, configured to convert a received voice information into a VoiceXML document, and to play the conversion result of the VoiceXML response document via the corresponding voice information; and
    a function mapping module, configured to parse the VoiceXML document according to a preset VoiceXML document framework, to search information of the function which needs be realized by the voice information corresponding to the VoiceXML document, to map the found function information to the function corresponding to the particular function of the man-machine interface function module, to inform the man-machine interface function module of the mapped function, and further configured to convert the response information from the man-machine interface function module to VoiceXML response document, and to send the conversion result to the interaction function interface module; wherein the function mapping module comprises:
- a configuration module, adapted to configure the VoiceXML document framework, wherein the VoiceXML document framework comprises at least one piece of function information and the corresponding VoiceXML document; and
- a VoiceXML parser, configured to determine a key node of the VoiceXML document from the voice recognition module, to search the corresponding key node in the VoiceXML document framework and to make the valid data corresponding to the found key node serving as the function information which needs be realized by the voice information, and further configured to convert response information from the function interaction module to VoiceXML response document; and
- the function interaction module, configured to map the found function information to the function corresponding to the man-machine interface function module, and to inform the man-machine interface function module of the mapped function, and to receive the response information from the man-machine interface function module.

6. The mobile terminal according to claim 5, wherein the interaction function interface module comprises:
- an interaction interface, configured to receive the voice information from a user, to send the voice information to a voice recognition module, and to play the voice information from the voice synthesis module;
- the voice recognition module, configured to extract identified text in the voice information from the interaction interface through the voice recognition based on VoiceXML, and to combine the extracted text into the VoiceXML document; and
- the voice synthesis module, configured to extract voice information in the VoiceXML response document from the function mapping module and to synthesize the voice information through voice synthesis based on VoiceXML.

7. The mobile terminal according to claim 5, wherein the function, corresponding to the man-machine interface function module and mapped by the function interaction module, is the information of the corresponding functional function and the function parameter which can be executed by the man-machine interface module.

* * * * *